United States Patent [19]

Rabow et al.

[11] 4,193,030

[45] Mar. 11, 1980

[54] FREQUENCY HOPPING COMMUNICATION SYSTEM

[75] Inventors: Gerald Rabow, Nutley, N.J.; Alvin E. Nashman, Falls Church, Va.

[73] Assignee: International Telephone and Telegraph Corporation, New York, N.Y.

[21] Appl. No.: 749,338

[22] Filed: Aug. 1, 1968

[51] Int. Cl.² .............................................. H04K 1/00
[52] U.S. Cl. ......................................... 375/2; 375/38; 375/46; 375/62; 375/67; 325/145
[58] Field of Search ................... 325/144, 163, 32, 30, 325/45, 61, 65, 145, 139; 340/17.1

[56] References Cited

U.S. PATENT DOCUMENTS

| | | | |
|---|---|---|---|
| 3,223,779 | 12/1965 | McFarlane | 325/30 |
| 3,384,822 | 5/1968 | Miyagi | 325/30 |
| 3,447,085 | 5/1969 | De Haas et al. | 325/61 |
| 3,493,866 | 2/1970 | Miller | 325/30 |
| 3,706,933 | 12/1972 | Bidell et al. | 325/32 |
| 3,824,468 | 7/1974 | Zegers et al. | 325/32 |

*Primary Examiner*—Howard A. Birmiel
*Attorney, Agent, or Firm*—John T. O'Halloran; Alfred C. Hill

[57] ABSTRACT

A signal modulated with information is hopped to discrete frequencies and its phase is selected to be 0° or 180° in each frequency hop interval under control of a pseudo noise binary code signal produced by a code generator. The discrete frequencies are generated in a binary frequency synthesizer and the phase is selected by a balanced modulator. One embodiment is a transceiver employing a single code generator for both transmission and reception. In another embodiment, a code generator is employed at the transmitter and another code generator is employed at the receiver of a communication system. In each embodiment, acquisition circuitry is employed to synchronize the code signal to the received frequency hopped and phase selected signal for synchronous detection of the information.

10 Claims, 4 Drawing Figures

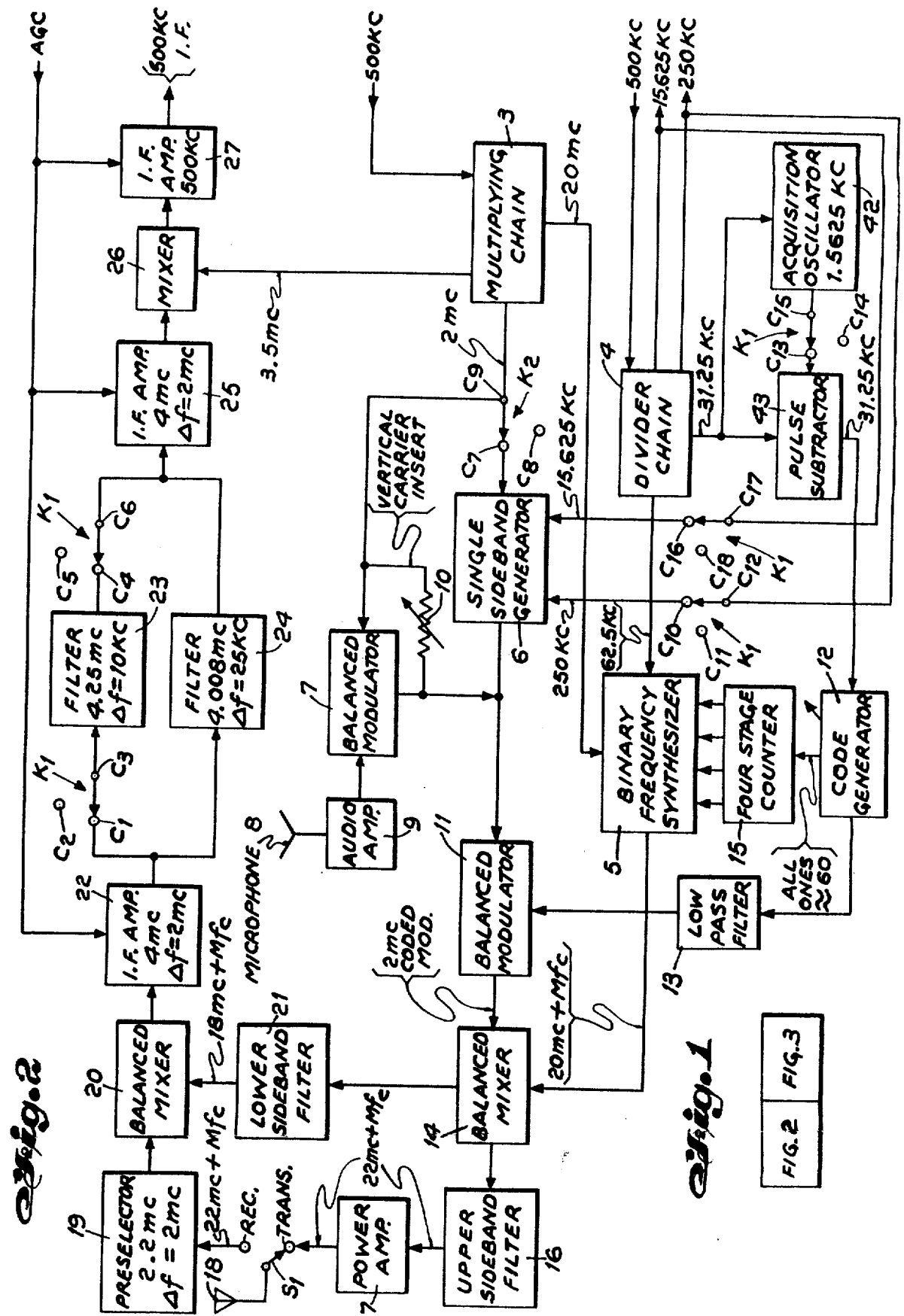

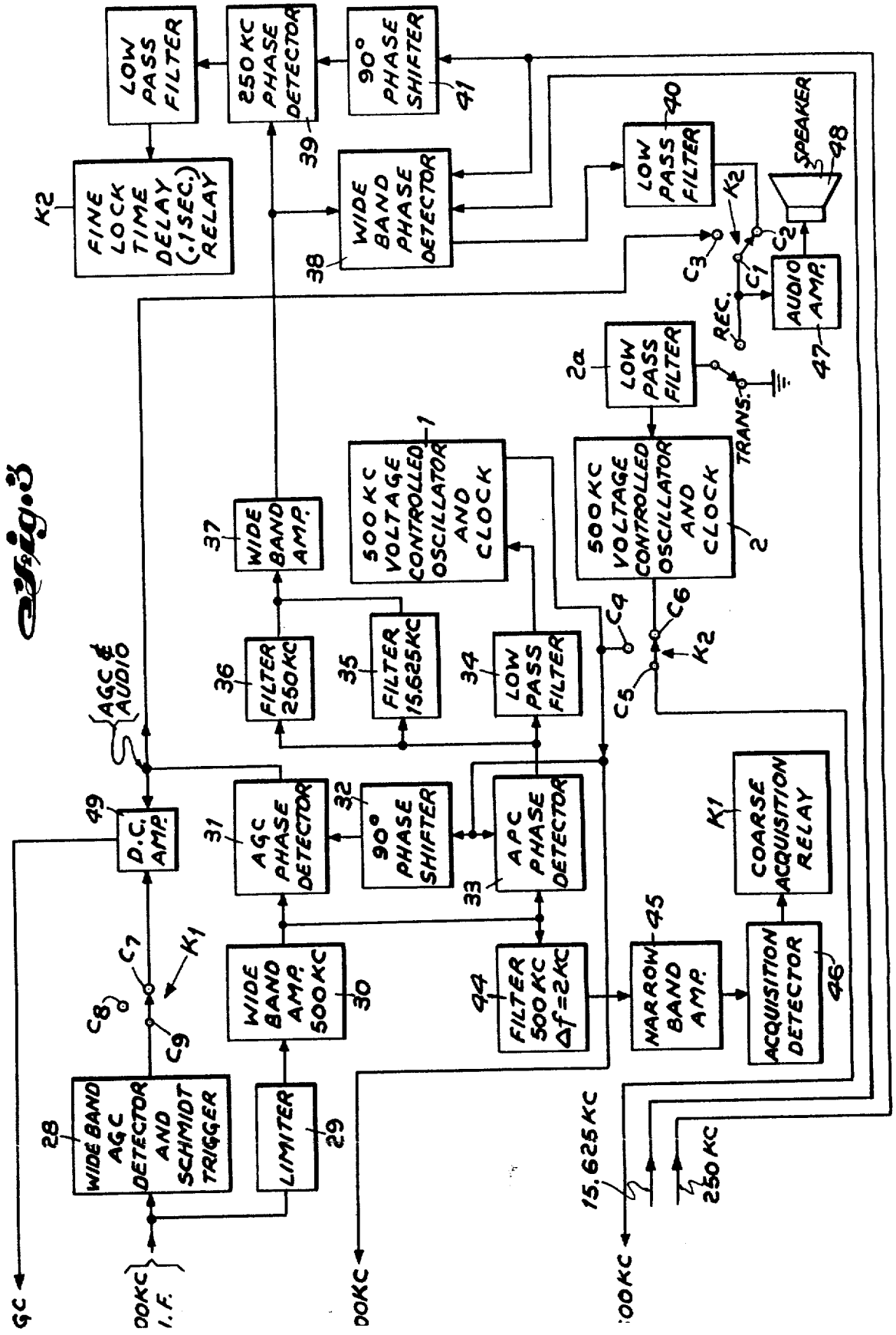

FREQUENCY HOPPING COMMUNICATION SYSTEM

BACKGROUND OF THE INVENTION

This invention relates to a communication system and more particularly to a spread spectrum or pseudo-noise communication system.

A spread spectrum or pseudo-noise communication system derives its name from a coding technique that translates the usual narrow band information spectrum into a wide band (spread) spectrum which resembles that of noise. The common ingredient of this class of communication system is the coder. A typical means of instrumenting the coder is with an n-stage shift register driven by a master clock. The stages of the shift register are interconnected by logical feedback elements. This produces an output consisting of a seemingly random binary sequence which is actually periodic. The number of bits in the sequence $N=2^n-1$ (in a typical embodiment) and the code period is N times the master clock period. By changing the logical connections between stages, different binary sequences are formed of which there are of the order of $2^n$. These unique combinations of binary "1" and binary "0" become, in effect, discrete addresses for a communication system of this type.

The coded transmission is recognized by the intended receiver through a correlation process. This involves the generation of an identical coded waveform within the receiver which is compared with the received signal. When the two identical coded waveforms are exactly aligned, the original narrow band information signal is reconstituted and can be detected by conventional techniques. Should the two waveforms be displaced an interval of time equal to the clock period, the correlator output becomes approximately zero. The necessity for close code synchronization is characteristic of this spread spectrum systems of the prior art and the present invention. This involves the use of acquisition circuitry which sweeps the phase between a transmitter-receiver code pair to bring them into coarse phase alignment followed by a track mode to maintain fine phase alignment.

A transmission with a coded waveform possessing a different binary sequence than the one generated in the receiver represents an interference between user sets. The rejection of an interfering signal is equal to the protection ratio which is the ratio of the spread spectrum bandwidth to the information bandwidth. For instance, a four megacycle (mc) spread spectrum system operating with a four kilocycle (kc) voice band has a protection ratio of 30 db (decibel). This means that the effective power of an interfering signal is reduced on the average by the protection ratio.

There are two spread spectrum systems known in the prior art, namely, phase reversal (or higher or pseudo-random phase modulation) and frequency hopping. These two types of systems have all the characteristics described for pseudo-noise systems but differ in one important respect which is their operation in an interfering environment.

The phase reversal system applies the coding technique to vary the phase of the voice modulated carrier in a pseudo-random (noise) fashion. Carrier phase is selected as either 0° or 180° depending on the binary state of the coded sequence. The system uses a common carrier frequency for all subscriber sets such that the interfering signals are present for the entire duration of any one desired transmission. The sum total of interfering power is reduced by the protection ratio.

In a phase reversal system, the transmitter carrier oscillator is modulated by voice signals. After amplification and perhaps frequency multiplication, the signal appears at the input to a balanced modulator. For a voice bandwidth of 4 kc, the total RF (radio frequency) spectrum spread will be 8 kc. The pseudo-random or pseudo-noise coding is accomplished in the balanced modulator by selecting the carrier phase as either 0° or 180° depending on whether a binary "1" or a binary "0" is present in the coding waveform. The resultant spread spectrum signal is then amplified and transmitted.

The received coded waveform is multiplied by the locally generated coded waveform in a balanced modulator. The resultant signal is passed through conventional IF (intermediate frequency) stages and detected by standard techniques with subsequent filtering to the voice bandwidth. This technique of multiplication and filtering is one way of instrumenting a correlation detector.

Since the coded waveforms in the transmitter and receiver have to be aligned within a reasonable time, sweep circuitry is employed in the receiver. Sweeping is accomplished by speeding up or slowing down the receiver clock with respect to the transmitter clock frequency. An acquisition peak detector will determine when coarse correlation occurs and stops the clock sweep. Once coarse phase alignment is obtained, fine synchronization is maintained by switch over to a tracking loop.

The frequency hopping type communication system applies the binary sequence code to select the frequency of transmission in a pseudo-random fashion. Each of the selected frequencies is voice modulated prior to transmission. The spread spectrum is achieved by hopping among x different frequencies. For instance, a one megacycle spread is obtained by hopping among 100 different frequencies spaced 10 kilocycles apart. The nature of the spectrum is also determined by the rate at which these frequencies are chosen. A fast hopping system implies a hopping rate in the order of the information bandwidth while a slow hopping rate is a rate much lower than the information bandwidth.

Interference from other subscriber sets is not continuous but occurs only during the intervals of time when both are on the same frequency. On the average, this will occur 1/x of the time between two subscriber sets. In this limited sense, the protection ratio of the frequency hop system can be considered equal to the number of hops x.

The frequency hop system has a block diagram that is almost identical to the phase reversal system described above. The frequency hop system is instrumented with a similar code generator driving a selection matrix such that one out of a group of $2^x$ frequencies is chosen for transmission in a pseudo-random fashion. The process of acquiring a desired signal involved sweeping the receiver bit clock until the presence of a signal signifies coarse alignment with the received signal. The sweep circuit is disabled and the bit clock maintains close synchronization with the received signal through a tracking loop. This process is basically identical to the phase reversal system.

SUMMARY OF THE INVENTION

An object of this invention is to provide a spread spectrum communication system capable of being operated in an environment where one or more sources of interference may be particularly strong.

Another object of this invention is to provide a spread spectrum communication system having an improved protection ratio.

Still another object of this invention is to provide a spread spectrum communication system capable of operating where interference sources are equipments of the same type as the present invention which happen to be located much closer to the receiver than the intended transmitter.

A further object of this invention is to provide a spread spectrum communication system that permits the maximum possible number of subscribers in a limited bandwidth multi-subscriber radio voice communication environment.

A further object of this invention is to provide a spread spectrum communication system without a central control which achieves a high number of addresses and simultaneous users through a judicious combination of pseudo-random frequency hopping and carrier phase reversals.

A feature of this invention is the provision of a spread spectrum communication system employing a combination of the frequency hopping and phase reversal techniques above described. This system applies the coding techniques of the prior art to select the frequency of transmission in a pseudo-random fashion. However, within each frequency hop interval, the signal is further modulated by selecting its phase as 0 degrees or 180 degrees also in a pseudo-random fashion. The spread spectrum nature of the transmission is similar to those of the frequency hop system. For instance, a one megacycle spread can now be obtained by hopping among 10 frequencies spaced 100 kilocycles apart. This spectrum is then filled in by phase reversing within each frequency interval at a 50 kc rate.

Interference between subscriber sets is reduced in two ways by the system of the present invention. Frequency hopping prevents interference at all times other than when the interference signal is on the same frequency as the desired signal. When this occurs, the effective power of the interference is further reduced by the protection ratio afforded by the phase reversing code. The total protection ratio against certain types of interference can be considered as x times the phase reversal ratio. This is simply the ratio of overall spread spectrum bandwidth to information bandwidth.

Another feature of this invention is the provision of a communication system comprising first means to generate a selected code signal; second means coupled to the first means to produce a first signal having a phase selected according to the code condition of the selected code signal; third means coupled to the first means to produce a second signal having a frequency that hops to different ones of a plurality of discrete frequencies as determined by the selected code signal; and a first intelligence signal coupled to one of the second and third means to modulate one of the first and second signals; the second and third means being interconnected to provide a first propagation signal modulated by the first intelligence signal having a frequency hopping characteristic and a selected phase in each frequency hop interval.

Still another feature of this invention is the provision of fourth means to generate the selected code signal synchronized to the selected code signal generated by the above mentioned first means; and fifth means coupled to the above mentioned interconnected second and third means and the fourth means to recover the first intelligence signal from the first propagation signal.

A further feature of this invention is the provision of fourth means to receive a second propagation signal modulated by a second intelligence signal at a remote location having a frequency hopping characteristic and a selected phase in each frequency hop interval similar to the above-mentioned first propagation signal produced by the above-mentioned interconnected second and third means; and fifth means coupled to the fourth means and the above-mentioned first means to recover the second intelligence signal from the second propagation singal.

BRIEF DESCRIPTION OF THE DRAWING

The above-mentioned and other features and objects of this invention will become more apparent by reference to the following description taken in conjunction with the accompanying drawings, in which:

FIG. 1 is a block diagram illustrating how the sheets of drawing containing FIGS. 2 and 3 should be disposed to illustrate one embodiment of the communication system inaccordance with the principles of this invention;

FIGS. 2 and 3, arranged as illustrated in FIG. 1, is a block diagram of a transceiver embodiment inaccordance with the principles of this invention.

DESCRIPTION OF THE PREFERRED EMBODIMENTS

Figure 4:
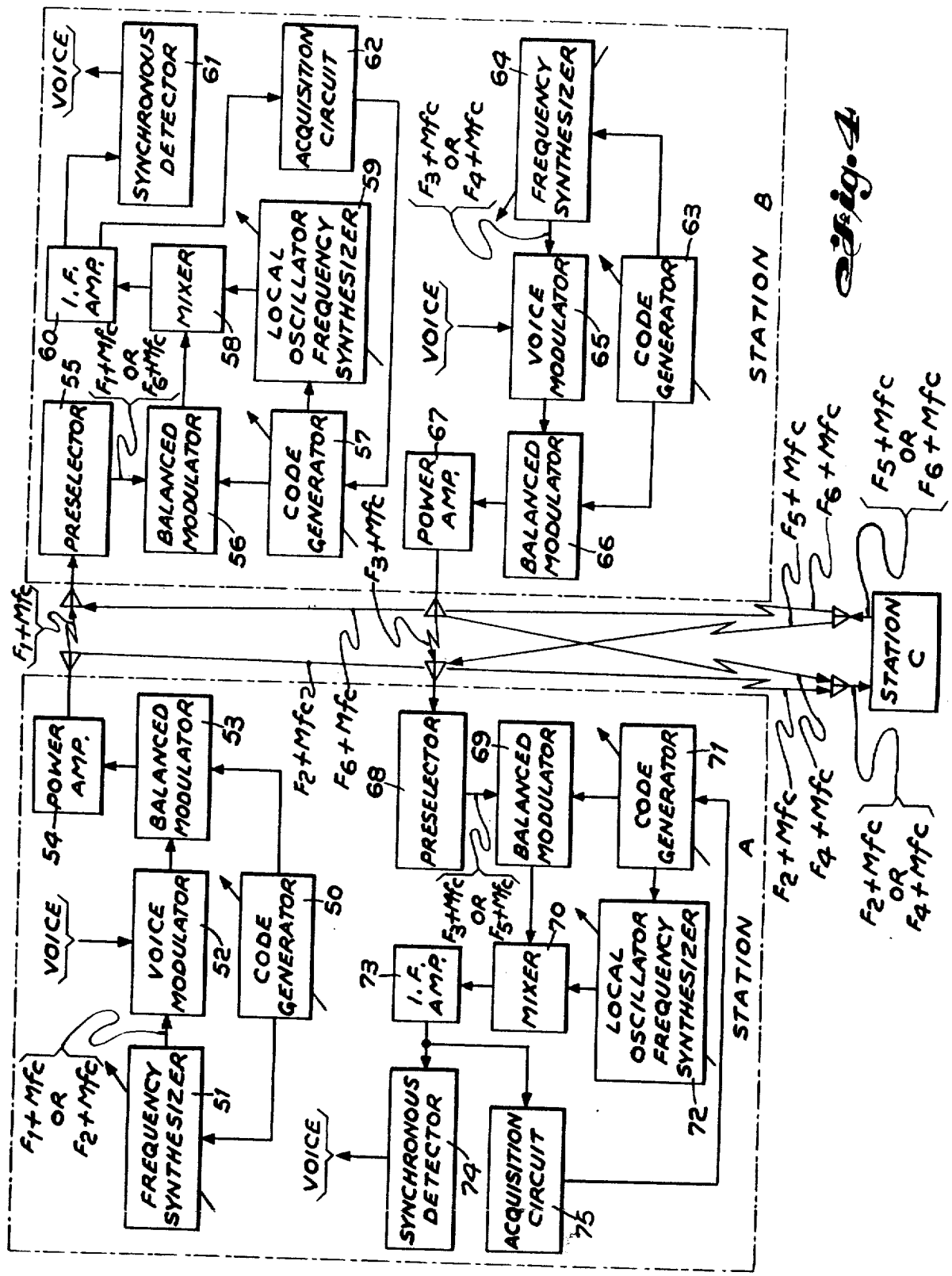
FIG. 4 is a block diagram illustrating another embodiment of the communication system inaccordance with the principles of this invention.

There has been employed herein specific frequencies and other specific values of the certain components of the system of this invention which are used only for the purposes of explanation and obviously can be changed to meet specific requirements of any proposed system.

In addition, it has been mentioned herein that the modulation signal is a voice signal which is used only for purposes of one example of the intelligence signal that may be employed in the present invention. There are many other types of modulating signals that can be employed, such as teletype, data, facsimile, television, and the like.

Referring to FIGS. 2 and 3, disposed relative to each other as illustrated in FIG. 1, there is illustrated a transceiver inaccordance with the principles of the present invention.

The transceiver of FIGS. 2 and 3, as well as the communication system of FIG. 4, eliminates the dynamic range or far-to-near ratio inherent in the straight phase reversal system and provides a system which would be optimum for random access voice application. For purposes of illustration, exemplary electrical parameters are as follows: bandwidth=1 mc; number of hopping frequencies=16; coder=9 stage; frequency hop rate=60 cycles; frequency of operation=22.5 mc; audio bandwidth=4 kc; discrete addresses=100; and modulation is double sideband suppressed carrier.

Before continuing with the detailed description of FIGS. 2 and 3 the following is a general description of the operation of the system of FIGS. 2 and 3. A spread spectrum of 1 mc is obtained by hopping between 16 frequencies at approximately a 60 cycle per second rate. The spacing between frequency hops is 1 mc/16=62.5 kc. The slow rate of hopping was chosen to take advantage of articulation characteristics of speech under correlation of interference. The spectrum between discrete frequencies is filled in by pseudo-noise phase reversing at a 31.25 kc rate. The type of modulation is double sideband suppressed carrier to increase the system user capacity.

The system is basically a stored reference system whose receiver section contains a 500 kc master clock generator identical to that of the transmitter. During acquisition, the receiver code must be synchronized to the transmitted code to within one bit of the 8,192 bits in the code word. The process of synchronizing the receiver code to the transmitter code is accomplished by subtracting pulses from the receiver code, thereby shifting their phase relationship. A 1.5625 kc oscillator subtracts a pulse from the code generator drive of 31.25 kc at a 1.5625 kc rate. This causes the code generator to lose one bit relative to the received signal code every 0.64 milliseconds. When the codes are aligned within one bit, the one megacycle spectrum of the received signal is compressed into a narrow bandwidth signal. This will be passed through a narrow band acquisition filter to a peak detector whose output fires a Schmidt trigger which stops coarse acquisition. The completion of the acquisition sequence is accomplished by phase detectors located in the receiver which operate on transmitted subcarriers and the transmitted carrier itself.

The basic clocks are voltage controlled oscillators and pulse generators 1 and 2 (oscillator 2 being used only during coarse acquisition) from which all local oscillators, subcarriers and transmitter frequencies are obtained. The use of multiplying chain 3 and divider chain 4 coupled to oscillators 1 and 2 provide system frequency coherency. The frequencies produced are the acquisition subcarriers at 15.625 kc and 250 kc; code generator drive at 31.25 kc; modulation subcarrier 2.0 mc; and reference subcarriers 62.5 kc and 20 mc for binary frequency synthesizer 5.

The 2.0 mc signal sideband modulated in single sideband generator 6 by the acquisition subcarriers during the acquisition period after acquisition generator 6 is switched out of the circuit since relay K2 has been activated along with relay K1 which removes the acquisition subcarriers from their inputs to generator 6. It should be noted that the coarse acquisition relay K1 controls several sets of contacts and switch arms illustrated in FIGS. 2 and 3 in a detached relationship to relay K1 but identified by the legend K1. The fine lock relay K2 is also represented with detached contacts and switch arms identified by the legend K2. For explanation purposes, let it be assumed that during coarse acquisition, relays K1 and K2 are inoperative which disposes their contacts in the illustrated position. After synchronization is accomplished relays K1 and K2 will be operated and the relay switch arms make contact with their other associated contact.

The following description is of the operation of the transceiver of FIGS. 2 and 3 in the transmit mode, that is, when the push-to-talk button is depressed to dispose switches S1 and S1' in the transmit position as illustrated.

The 2.0 mc subcarrier is modulated in balanced modulator 7 by the audio signal coupled from microphone 8 and audio amplifier 9. There is added to the output of modulator 7 a vestigial carrier by means of resistor 10 which is coupled to balanced modulator 11 for coding to provide the pseudo-noise binary phase reversal by the output of code generator 12 coupled through low pass filter 13. Low pass filter 13 is employed to limit the spread spectrum to 62.5 kc by filtering the coding waveform. This is done to prevent adjacent frequency hop interference.

The output of modulator 11 is coupled to balanced mixer 14 which is heterodyned therein with a local oscillator signal at the output of synthesizer 5 generated in response to the code generator 12 and the four-stage counter 15. The output of synthesizer 5 hops from 20 to 21 mc in 62.5 kc steps. The upper sideband signal of mixer 14 is extracted by upper sideband filter 16, coupled to power amplifier 17 and then through switch S1 to antenna 18.

The frequency hopped local oscillation at the output of synthesizer 5 is produced by combining the 20 mc carrier at the output of multiplying chain 3 with harmonics of the 62.5 kc at the output of divider chain 4 to produce a frequency hop signal of $20 \text{ mc} + Mf_c$ where $f_c$ equals, in this instance, 62.5 kc and M equals the harmonic thereof. The 31.25 kc subcarrier from divider chain 4 is used as a clock for code generator 12. The all "1" pulses from the code generator, which occurs once for each code word, is used to drive a four-stage counter 15. The all "1" rate is approximately 60 cycles per second. The output of the four-stage counter 15 changes the frequency output of synthesizer 5. The binary condition of the four-stages of counter 15 determines which of the 16 frequencies of synthesizer 5 is generated. Details of the frequency synthesizer 5 and counter 15 is fully disclosed in the copending application of J. Kadin et al, Ser. No. 737,417, filed June 17, 1968.

The following description is of the transceiver in the receive mode accomplished by releasing the position-to-talk button which will activate switches S1 and S1' to the receive position. The received signal which was coded in a distant transceiver by the same code as employed in the illustrated transceiver is received on antenna 18, passed through preselector 19 and, hence, to balanced mixer 20. The local oscillator signal applied to mixer 20 is hopped in frequency from 18 to 19 mc in 62.5 kc steps and is extracted by lower sideband filter 21 coupled to mixer 14 which as previously described is used to produce the transmitter signal.

The output of filter 21 is mixed in mixer 20 with the output of circuit 19 which hops from 22–23 mc and is similarly coded. If the system is in synchronism, the input signal will be heterodyned to a single IF frequency which will pass through IF amplifier 22, filter 24 (relay K1 is operated and filter 23 is removed from the circuit), IF amplifier 25, mixer 26, IF amplifier 27 and wideband AGC detector 28. The output of amplifier 27 is also coupled through limiter 29, wideband amplifier 30 and AGC detector 31 which receives its other input from oscillator 1 and phase shifter 32. The output of amplifier 30 is also coupled to phase detector 33 which receives its other input directly from oscillator 1. If as assumed the system is in synchronism there will be no output from phase detector 33 which is the automatic phase control phase detector and there will be no signal through low pass filter 34 to control oscillator 1. Hence, the subcarriers 15.625 kc and 250 kc will be passed through filters 35 and 36, respectively, and, wideband amplifier 37. The output of amplifier 27 will then be coupled to wideband phase detector 38 and the 250 kc phase detector 39. The other input for detector 38 is the subcarriers 15.625 kc and 250 kc which will result, provided there is phase synchronism, in a zero output coupled to low pass filter 40. The other input for phase detector 39 is the 250 kc subcarrier signal coupled through phase shifter 41. Thus, if the codes of generator 12 and the received signal are in synchronism, all the energy will be in a 8 kc information RF bandwidth which will pass through the coherent detector filter 24 and the audio signal will appear at the output of detector 31 for coupling to audio amplifier 47 and speaker 48. It should be noted at this point that relay K2 is operated and moves its switch arm from contact C2 to C3 to properly connect amplifier 47 to the output of detector 31.

When the system is out of synchronization and coarse acquisition is desired, the 15.625 kc signal from filter 35 will be compared in detector 38 with the 15.625 kc output of divider chain 4 and produce a control signal for coupling through filter 40 contacts C1 and C2 of relay K2, and S1 in receive position, and low pass filter 2a to control oscillator 2 also phase detector 33 will produce an error signal which will control oscillator 1. In this condition, amplifier 23 is in the circuit to couple received IF signal to amplifier 30 if this signal is well outside the passband of filter 24. Additionally, an acquisition oscillator 42 will be activated and pulse subtractor 43 will subtract the drive input to generator 12 at a 1.5625 kc rate. When sychronization is within one bit the output of amplifier 30 will be coupled to filter 44, hence, to narrow band amplifier 45 and then to acquisition detector 46 which incorporates therein a Schmidt trigger to activate relay K1 and cause the switch arms associated therewith to move to the unconnected contacts thereby disabling the coarse acquisition. Finer acquisition is accomplished with the 250 kc subcarrier in detector 38. When this finer synchronization is achieved this is detected by detector 39 which activate relay K2 after a time delay which places the switch arms thereof in a tracking position and enables the coupling of the audio from the output of detector 31 through audio amplifier 47 to speaker 48. The final acquisition and tracking is accomplished in phase detector 33.

As previously mentioned, oscillator 2 is utilized only during coarse acquisition and is removed from the circuit when relay K2 is activated.

Coherent detection is used to maximize noise immunity. AGC detector 28 is used before acquisition is achieved and incorporates therein a Schmidt trigger to remove noise spikes above a certain level. After acquisition the AGC phase detector 31 provides a coherent AGC and also the audio or voice signal carried by the received signals. Both AGC signals are coupled through DC amplifier 49 back to IF amplifier 22, 25 and 27.

Referring to FIG. 4, there is illustrated therein a multisubscriber communication system employing the technique of the present invention. In this communication system there is employed a code generator in the transmitter and receiver of each one way communication system rather than the single code generator of the transceiver according to the system illustrated in FIGS. 2 and 3.

Station A includes a transmitter having code generator 50 whose code is adjusted to the address code of Station B or Station C. The output of generator 50 controls the frequency synthesizer 51 to provide the hopped carrier frequency. Synthesizer 51 which produces an output F1+Mfc if it is communicating with Station B or an output F2+Mfc if it is desired to communicate with station C. The hopped frequency of synthesizer 51 is coupled to voice modulator 52 to modulate the voice intelligence on the hopped frequency signal. The output from modulator 52 is coupled to a balanced modulator 53 which is under control of generator 50 to select the phase of the signal coupled to power amplifier 54 in each of the frequency hopped intervals.

Assuming that the code generator 50 produces the address code of station B and synthesizer 51 is selected to provide a frequency output F1+Mfc this signal will be detected by preselector 55 in station B and coupled to balanced modulator 56 which is under control of code generator 57 having a code which is the address code of station B. The balanced modulator 56 output is coupled to mixer 58 whose local oscillator signal is supplied by frequency synthesizer 59. The cooperation of balanced modulator 56, mixer 58, frequency synthesizer 59 and code generator 57 produces an intermediate frequency signal which is coupled by IF amplifier 60 to a synchronous detector 61 to recover the voice intelligence transmitted from station A.

As in the arrangement of FIGS. 2 and 3, it is necessary to synchronize the code generator 57 output to the signal applied to modulator 56 from preselector 55. This is accomplished by acquisition circuit 62 which may take a form similar to that illustrated in FIGS. 2 and 3.

For station B to transmit intelligence to station A, or station C there is employed a code generator 63 which has its code adjusted to be the address code of station A if communication therewith is desired, or the address code of station C if communication therewith is desired. Generator 63 controls the selection of the frequency output of synthesizer 64 to provide the hopped frequency signal. The frequency output of synthesizer 64 is adjusted to be F3+Mfc if communication is desired with station A. The output of synthesizer 64 is adjusted to frequency F4+Mfc if communication is desired with station C. The hopped frequency signal output of synthesizer 64 is coupled to voice modulator 65 to modulate voice intelligence on the hopped frequency. The output of modulator 65 is coupled to balanced modulator 66 which under control of generator 63 selects the phase of the signal transmitted in each frequency hop interval. The output of modulator 66 is coupled to power amplifier 67 and then, for instance, is propagated to station A provided generator 63 and synthesizer 64 are properly adjusted as to address code and frequency of transmission. The signal transmitted to station A is selected by preselector 68 for coupling to balanced modulator 69 and, hence, to mixer 70. Modulator 69 is controlled by code generator 71 having its own address code which would be identical to the code set up in generator 63 of station B. Code generator 71 controls frequency synthesizer 72 to provide the local oscillator signal for mixer 70. Thus, code generator 71, balanced modulator 69, mixer 70 and synthesizer 72 cooperate to provide an intermediate frequency for application to IF amplifier 73 the output of which is applied to synthesizer detector 74 to detect the voice intelligence applied to modulator 65 of station B. As previously, acquisition circuit 75 is provided for operation on code generator 71 to assure synchronization between the output code thereof and the code of the received signal.

Station C would be provided with components similar to station A or station B with the transmitting code generator having its code adjusted to the address code of station A if communication is desired therewith, or to the address code of station B if communication is desired with this station. The receiving code generator of station C would have its code adjusted according to the address of either station A or B depending on which station is communicating with station C. The frequency synthesizer for the transmitting portion of station C produces a hopped frequency output of either F5+Mfc or F6+Mfc depending on which of the stations A or B station C is communicating with. The receiving frequency synthesizer would have the hopped frequency adjusted to either F2+Mfc or F4+Mfc depending on whether station A or station B is communicating with station C.

To enable each station A, B and C to recognize whether a signal it is receiving has its address, a monitor receiver could be employed (not shown) to detect the presence of the hopped frequency being received. This will tell the station operator which station desires communication therewith. Using a prearranged address code of the station whose frequency was detected will enable the proper adjustment of the code generator and synthesizer of the transmitting portion of the receiver to bring about the desired two way transmission.

While we have described above the principles of our invention in connection with specific apparatus, it is to be clearly understood that this description is made only by way of example and not as a limitation to the scope of our invention as set forth in the objects thereof and in the accompanying claims.

We claim:

1. A communication system comprising:
   first means to generate a selected code signal;
   second means coupled to said first means to produce a first signal having a phase selected according to the code condition of said selected code signal;
   third means coupled to said first means to produce a second signal having a frequency that hops to different ones of a plurality of discrete frequencies as determined by said selected code signal; and
   a first intelligence signal coupled to one of said second and third means to modulate one of said first and second signals;
   said second and third means being interconnected to provide a first propagation signal modulated by said first intelligence signal having a frequency hopping characteristic and a selected phase in each frequency hop interval.

2. A system according to claim 1, wherein
   said first means generates as said selected code signal a binary code signal; and
   said second means selects the phase of said first signal to be 0° phase in response to one condition of said binary code signal and 180° phase in response to the other condition of said binary code signal.

3. A system according to claim 1, wherein
   said first means generates as said selected code signal a pseudo-random binary code signal;
   said second means is responsive to said pseudo-random code signal to select the phase of said first signal in a pseudo-random manner; and
   said third means is responsive to said pseudo-random code signal to cause the frequency of said second signal to hop to different ones of said plurality of discrete frequencies in a pseudo-random manner.

4. A system according to claim 3, wherein
   said second means selects the phase of said first signal to be 0° phase in response to one condition of said pseudo-random code signal and 180° phase in response to the other condition of said pseudo-random code signal.

5. A system according to claim 1, wherein
   said third means includes
      a frequency synthesizer coupled to said first means generating a third signal having said frequency hopping characteristic, and
      an intelligence signal modulator coupled to the output of said synthesizer and receiving said first intelligence signal to modulate said third signal with said first intelligence signal; and
   said second means includes
      a balanced modulator coupled to said first means and the output of said intelligence signal modulator to produce said first propagation signal.

6. A system according to claim 1, further including
   fourth means to generate said selected code signal synchronized to said selected code signal generated by said first means; and
   fifth means coupled to said interconnected second and third means and said fourth means to recover said first intelligence signal from said first propagation signal.

7. A system according to claim 6, wherein
   said third means includes
      a first frequency synthesizer coupled to said first means generating a third signal having said frequency hopping characteristic, and
      an intelligence signal modulator coupled to the output of said synthesizer and receiving said first intelligence signal to modulate said third signal with said first intelligence signal;
   said second means includes
      a first balanced modulator coupled to said first means and the output of said intelligence signal modulator to produce said first propagation signal; and
   said fifth means includes
      a second balanced modulator coupled to said fourth means and said first balanced modulator,
      mixer means coupled to said second balanced modulator, a second frequency synthesizer coupled to said mixer means and said fourth means, and
      synchronous detection means coupled to said mixer means to recover said first intelligence signal.

8. A system according to claim 1, wherein
   said second means includes
      a source of third signal having a given frequency,
      a frequency synthesizer coupled to said first means generating a fourth signal having said frequency hopping characteristics,
      a first balanced modulator coupled to said source and receiving said first intelligence signal to modulate said third signal with said first intelligence signal, and
      a second balanced modulator coupled to said frequency synthesizer and said first balanced modulator; and
   said third means includes
      a balanced mixer coupled to said second balanced modulator and said first means to produce said first propagation signal.

9. A system according to claim 1, further including
fourth means to receive a second propagation signal modulated by a second intelligence signal at a remote location having a frequency hopping characteristic and a selected phase in each frequency hop interval similar to said first propagation signal; and
fifth means coupled to said fourth means and said first means to recover said second intelligence signal from said second propagation signal.

10. A system according to claim 9, wherein
said second means includes
   a voltage controlled oscillator,
   sixth means coupled to said oscillator to generate at least first and second timing signals,
   seventh means coupled to said first means and said sixth means to adjust the phase of said first timing signal to cause said selected code signal to be in phase with said frequency hopping characteristic and said selected phases of said second propagation signal,
   a frequency synthesizer coupled to said first means generating a third signal having said frequency hopping characteristic,
   a first balanced modulator coupled to said sixth means and receiving said first intelligence signal to modulate said second timing signal with said first intelligence signal, and
   a second balanced modulator coupled to said frequency synthesizer and said first balanced modulator;
said third means includes
   a first balanced mixer coupled to said second balanced modulator and said first means to produce said first propagation signal; and
said fifth means includes
   a second balanced mixer coupled to said first balanced mixer,
   eighth means including a phase locked loop coupled to said second balanced mixer, said seventh means and said oscillator to detect an out-of-phase condition between said second propagation signal and said selected code signal to control said oscillator and activate said seventh means to achieve phase synchronism, and
   ninth means coupled to said phase locked loop to recover said second intelligence signal.

* * * * *